United States Patent [19]
Takahashi

[11] Patent Number: 5,090,010
[45] Date of Patent: Feb. 18, 1992

[54] DISC CARTRIDGE

[75] Inventor: Yoshinori Takahashi, Yokohama, Japan

[73] Assignee: Kabushiki Kaisha Toshiba, Kawasaki, Japan

[21] Appl. No.: 514,887

[22] Filed: Apr. 26, 1990

[30] Foreign Application Priority Data

Apr. 27, 1989 [JP] Japan ............... 1-48878[U]
Jun. 8, 1989 [JP] Japan ............... 1-144103

[51] Int. Cl.⁵ ............... G11B 3/58; G11B 7/00
[52] U.S. Cl. ............... 369/291; 369/292; 360/133
[58] Field of Search ............... 369/282, 291, 292; 360/99.05, 99.12, 133, 137

[56] References Cited

U.S. PATENT DOCUMENTS

| | | | |
|---|---|---|---|
| 4,459,628 | 7/1984 | Barton | 360/99.12 |
| 4,734,815 | 3/1988 | Naganawa | 360/133 |
| 4,750,075 | 6/1988 | Oishi | 360/133 |
| 4,757,412 | 7/1988 | Iizuka | 360/133 |
| 4,791,515 | 12/1988 | Tanaka | 369/291 |
| 4,791,516 | 12/1988 | Seto | 360/133 |
| 4,899,244 | 2/1990 | Morse | 360/133 |
| 4,944,982 | 7/1990 | Kikuchi | 369/282 |

FOREIGN PATENT DOCUMENTS

| | | | |
|---|---|---|---|
| 0301866 | 2/1989 | European Pat. Off. | 369/292 |
| 59-68878 | 4/1984 | Japan . | |
| 0214288 | 9/1986 | Japan | 360/133 |
| 63-129580 | 6/1988 | Japan . | |

*Primary Examiner*—Stuart S. Levy
*Assistant Examiner*—John C. Pokotylo
*Attorney, Agent, or Firm*—Cushman, Darby & Cushman

[57] ABSTRACT

A disc cartridge of the present invention has magnetic means provided on an inner surface at least one of a pair of housing means which faces information recording means and acting on a hub for fixing a magnetic disc so that the magnetic disc is prevented from being vibrated in the disc cartridge. In consequence, the present invention provides a disc cartridge which operates at a high reliability and in which foreign matter such as dust is not produced.

14 Claims, 8 Drawing Sheets

DISC CARTRIDGE

BACKGROUND OF THE INVENTION

1. Field of the Invention

The present invention relates to a disc cartridge in which a disc comprising information recording means is rotatably mounted and more particularly to a disc cartridge in which a portion at the vicinity of a hub disposed at the central portion of the disc is improved.

2. Description of the Related Art

As information processing apparatuses such as personal computers and personal word processors have been developed, magnetic floppy discs as handy information recording means as well as optical disc cartridges for optically reproducing information have been frequently used.

An external information recording device will now be explained by a 3.5 inch magnetic disc cartridge. The disc cartridge consists of a disc coated with a binder having powered magnetic material evenly distributed as a recording medium, and a case comprising a pair of integrally formed half cases made of ABS resin. In the center of the disc is a hub which has a central hole and a hole displaced from the center of the hub. In a corner of the case is a write protector for inhibiting information recording. In the case formed a pair of windows in which is inserted a magnetic head for reproducing information from a magnetic disc and recording the information on the magnetic disc. A movable U-shaped shutter made of metal covers a part of the case. A hole for the write protector is also formed in the case. In one of the half cases is formed a circular hole at which is exposed the hub provided in the central portion of the magnetic disc. On both surfaces of the case are attached liners made of non-woven fabric for removing foreign matter such as dust. Between one of the half cases and the respective liner is disposed a lifter for pressing the liner in a direction toward the magnetic disc. The U-shaped shutter is inserted in the case when both half cases are joined together. A spring engages the shutter so that the spring shutter covers the pair of windows formed in the case in the above-mentioned direction.

Ample space is left around the magnetic disc in the magnetic disc cartridge to allow the magnetic disc to be freely rotated. The magnetic disc is moved slightly in the case when the magnetic disc cartridge is swung by a external force or the like in an unused state in which the magnetic disc is not set on disc driving means. Since the magnetic disc is in contact with the liner by means of the lifter in this state, the lifter, magnetic disc and liners are sometimes rubbed with one another to produce dust which may cause trouble such as a reproducing error.

Recently, recording capacity has been increased not only in recording devices and recording material but also in the above-mentioned magnetic discs. The width of the tracks and the distance between the adjacent tracks have been rendered smaller and smaller, and a linear recording density per unit of the circumferential length on each track has been made higher and higher.

In doing so, there has been developed a magnetic disc coated with an alloy film such as Co-Cr by a vacuum process such as the sputtering method or the evaporating method, and a magnetic disc which has a supporter coated with magnetic powder such as Barium ferrite fine particles and a binder.

These magnetic discs having a high recording capacity has a narrower track width, a smaller distance between the adjacent tracks and a higher linear recording density than the conventional magnetic discs. Thus, dust has a large adverse effect on the magnetic disc. Specifically, dust of such a small size that does not cause trouble on the conventional magnetic disc having ordinary tracks and/or an ordinary line recording density is likely to bring about trouble on the magnetic disc having a large recording capacity. In other words, very fine dust causes drop-out. It is, therefore, necessary to reduce foreign matter such as dust produced in the magnetic disc cartridge.

SUMMARY OF THE INVENTION

An object of the present invention is to provide a magnetic disc cartridge in which foreign matter such as dust is rarely produced even if an external force is applied to the magnetic disc cartridge and any error such as drop-out scarcely occurs.

Another object of the present invention is to provide a magnetic disc cartridge in which a magnetic disc is prevented from being strongly pressed by means of a lifter thereby greatly reducing the deformation of both the magnetic disc and the lifter.

In order to attain the objects, the magnetic disc cartridge according to the present invention comprises disc-shaped information memory means for recording and reproducing information, driving force transmitting means provided on a central portion of the information memory means, a pair of housing means, one of the housing means having in a central portion thereof an opening at which is exposed the driving force transmitting means of the information memory means, and magnetic means for acting on the driving force transmitting means, the magnetic means being provided on a surface of said one of the housing means or each of both housing means, which faces the information memory means.

In the magnetic disc cartridge of the present invention, foreign matter such as dust is drastically reduced and the deformation of the magnetic disc and the lifter is remarkably lessened.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The present invention will now be described by embodiments with reference to the accompanying drawings.

Figure 1:
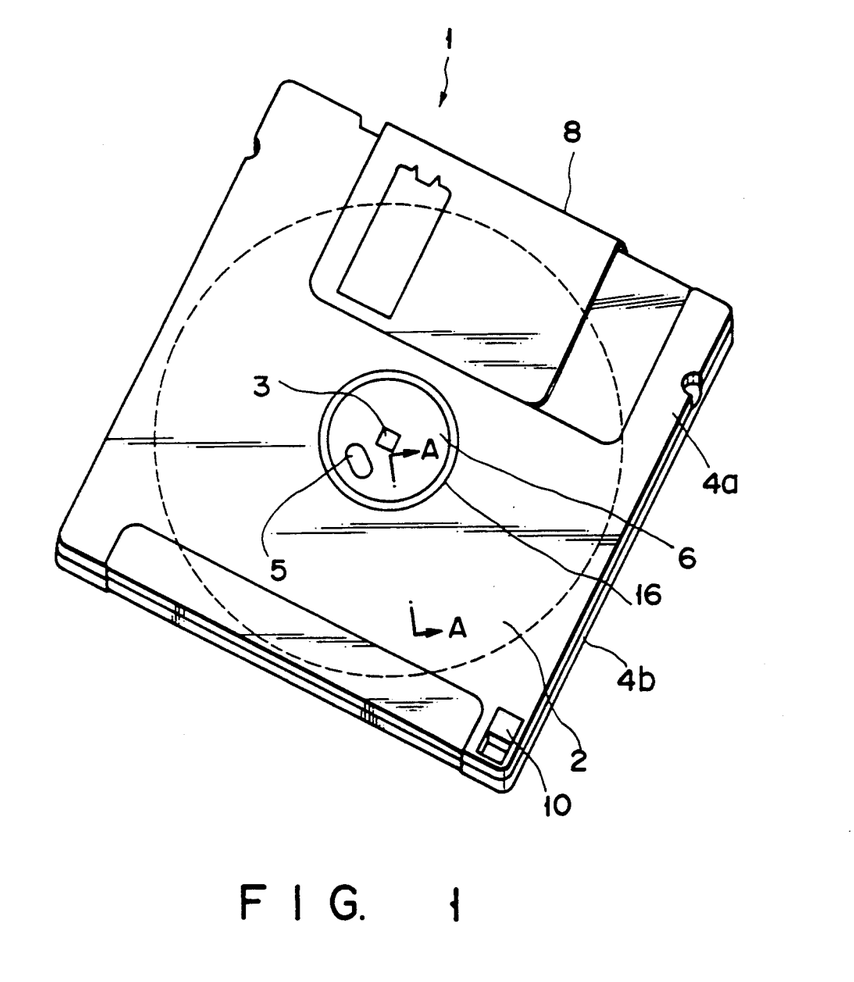
FIG. 1 is a schematic perspective view of a magnetic disc cartridge according to the first embodiment of the present invention.

In FIG. 1 is shown a 3.5 inch magnetic disc cartridge 1 according to the first embodiment of this invention, which comprises a magnetic disc 2 coated with magnetic material essentially consisting of a binder and magnetic fine particles distributed therein and a case consisting of two half cases 4a and 4b formed integrally with each other. In the central portion of the magnetic disc 2 is provided a hub 6 in which are formed a central hole 3 and a hole 5 displaced from the center of the hub 6. In the half case 4a is formed a circular hole 16 at which the hub 6 is exposed. A movable U-shaped shutter 8 covers a portion of each of the half cases 4a and 4b. In a corner of each of the half cases 4a and 4b is provided a write protector 10 for inhibiting information recording.

Figure 2:
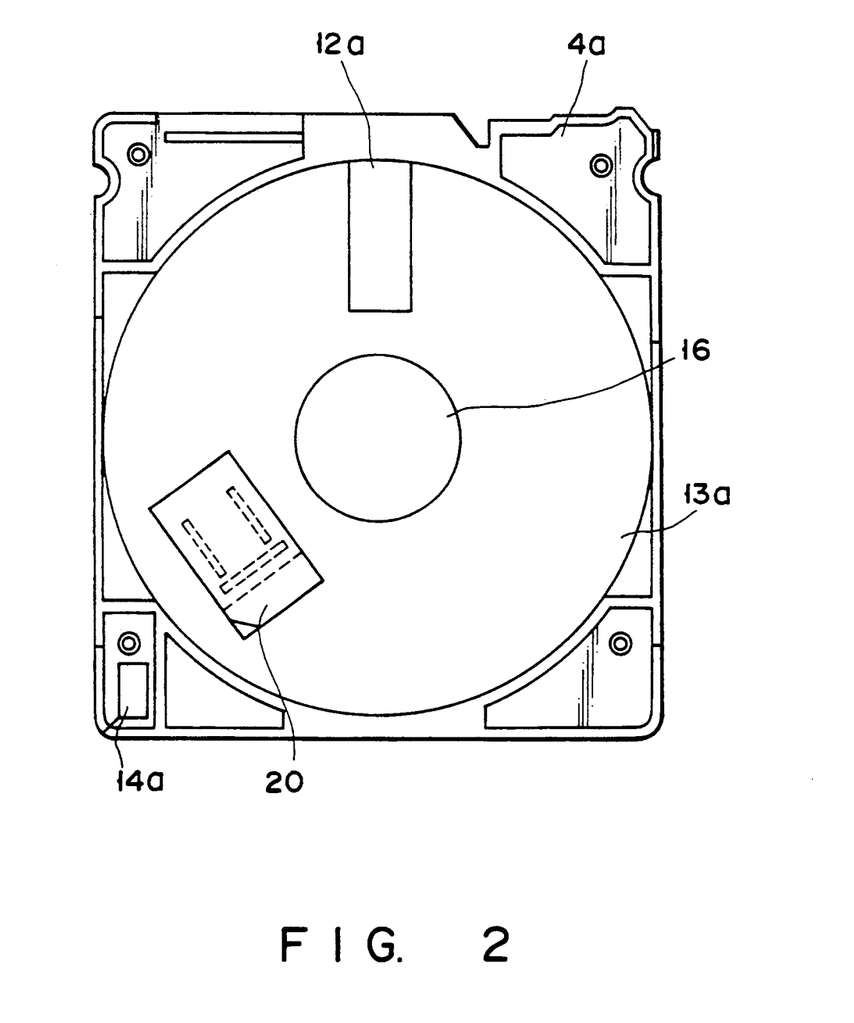
FIG. 2 is a plan view showing the interior of one of the two half cases of the magnetic disc cartridge of FIG. 1.

In FIG. 2 is shown a half case 4a of the magnetic disc cartridge 1. In the half case 4a is formed a window 12a in which is inserted a magnetic head, not shown, for recording information on the magnetic disc 2 and reproducing information therefrom, a substantially circular surface 13a for holding the magnetic disc 2, and a hole 14a for the write protector 10. A liner 18a (FIG. 4) is connected to a part of the surface 13a of the half case 4a. On the surface 13a is provided a metal lifter 20 for pressing the liner 18a in a direction in which the lifter 20 is upwardly departed from the surface 13a in FIG. 2.

Figure 3:
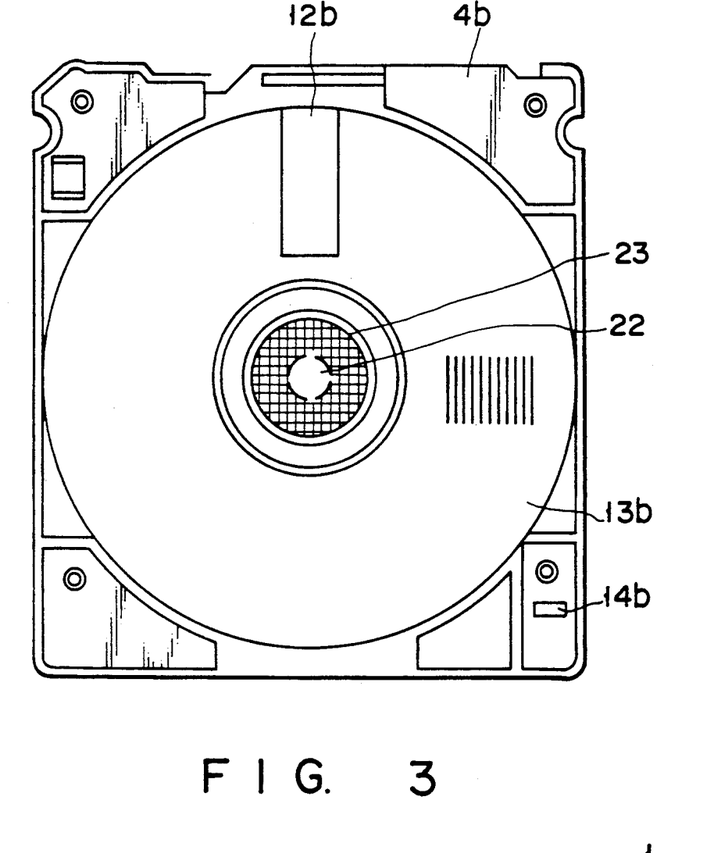
FIG. 3 is a plan view showing the interior of the other half case of the magnetic disc cartridge of FIG. 1.

In FIG. 3 is shown the half case 4b having a window 12b in which is inserted the magnetic head, not shown, for recording information on the magnetic disc 2 and reproducing information therefrom. In the half case 4b is formed a substantially circular surface 13b for holding the magnetic disc 2. A liner 18b (FIG. 4) is connected to a part of the surface 13b of the half case 4b. A hole 14b for the write protector 10 is formed in the half case 18b. On the inner surface of the low case 4b is formed a center sheet 22 made of hard resin material which a ring-shaped permanent magnet 23 comprising magnetic means for attracting the hub 6 of the magnetic disc 2 coaxially surrounds.

Figure 4:
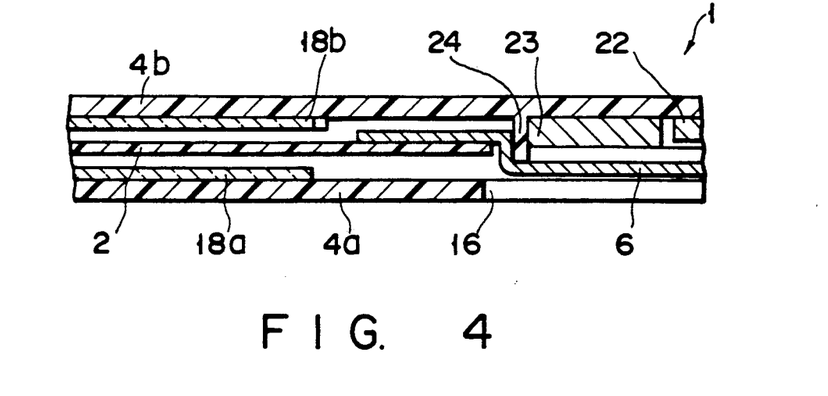
FIG. 4 is a partial cross-sectional view of the magnetic disc cartridge along line A—A in FIG. 1.

In FIG. 4 is shown the magnetic disc cartridge 1. The magnetic disc 2 is rotatably housed in the case consisting of the half cases 4a and 4b. When the magnetic disc cartridge 1 is not mounted on a disc driving device, not shown, the hub 6 is attracted by the magnet 23 in the half case 4b to move the magnetic disc 2 toward the case 4b, as shown in FIG. 4. Since annular projecting portion 24 is higher than the magnet 23 and surrounds the magnet 23, the magnetic disc 2 does not directly contact the magnet 23. In other words the magnetic disc 2 is attracted by the magnet 23 but is stopped by the projecting portion 24 in non-contact and immovable state therewith. The magnetic disc 2 is disposed at the side of the half case 4b and thus lightly touches on the lifter 20 in the case 4a. As the magnetic disc 2 having the hub 6 is stopped by the projecting portion 24, the magnetic disc 2 and the other members such as the liner 18a and the disc 2, are not rubbed with one another when the magnetic disc cartridge 1 is swung. This greatly reduces the generation of dust in the magnetic disc cartridge 1. In the conventional magnetic disc cartridge, since the lifter is always pushed by the reaction of the magnetic disc, the lifter is gradually deformed and its function deteriorates. According to this invention, however, the pressing force applied from the lifter 20 to the magnetic disc 2 as well as the reaction of the magnetic disc 2 to the lifter 20 is weak. Therefore, the magnetic disc 2 and the lift 20 are rarely deformed.

When the magnetic disc cartridge 1 is mounted on the disc driving device, not shown, the hub 6 of the magnetic disc 2 is attracted by the magnetic disc driving device to be moved toward the half case 4a and is chucked by the disc driving device.

The magnetic disc cartridge 1 of this kind can be used to carry out recording/reproducing at a high reliability without drop-out.

When the magnetic disc cartridge is not chucked by the disc driving device, the magnetic disc 2 is disposed at the side of the half case 4b and forced against the projecting portion 24 by the magnet 23. In this state, the liners 18a and 18b and the magnetic disc 2 are not rubbed with each other and thus no dust is produced. The pressing force applied from the lifter 20 to the magnetic disc 2 is weak. Even if the magnetic disc cartridge 1 is stored for a long time, the magnetic disc 2 and the lifter 20 are rarely deformed. Experiments were made as to the changes in reproduction output of the magnetic disc cartridges 1 according to this embodiment and the conventional magnetic disc cartridges. After both magnetic disc cartridges having changes in reproduction output of 5% or less in a normal state were kept for 72 hours in an atmosphere of 60° C. and 90% RH, the magnetic disc cartridges of the present invention showed changes in reproduction output of 8%, while the conventional magnetic disc cartridges exhibited changes in reproduction output of 20%. The experiments showed that the magnetic disc cartridge of the present invention has higher reliability and durability than the conventional one. Clearly, the present invention is more advantageous than the conventional on in this respect.

The first embodiment of the present invention is applicable not only to a magnetic disc cartridge as mentioned above but also to an optical magnetic disc cartridge and can also use a magnetic disc cartridge of a size other than 3.5 inches. The combination of a center sheet 22 and a ring-shaped magnet 23 coaxially surrounding the center sheet 22 may be replaced by a center sheet containing magnetic material and covering all area of the central portion which the center sheet and the magnet of the first embodiment occupy. The first embodiment may use, instead of a magnet 20, any magnetic means having an attracting force larger than the total weight of a magnetic disc and a hub 6 smaller than the attracting force of a magnet for chucking a disc driving device.

In the first embodiment, the permanent magnet is disposed not only in a half case having a center sheet but also in the other half case so that the magnet is placed on a disc holding surface around a circular hole of the other half case. In this case, a hub is coated with magnetized material The magnetized material is arranged such that its magnetic polarity is the same as that of the permanent magnet in the other half case. The hub is repelled by the magnetic force of the permanent magnet in the other half case to be fixed in the half case having the center sheet. As a result, foreign matter such as dust is not generated in the half cases even if an external force is applied to the magnetic disc cartridge. Further, as a magnetic disc, liners and a lifter weakly contact each other, the deformation and the deterioration of the strength of the lifter are greatly reduced.

The second embodiment of the present invention will now be explained.

Figure 5:
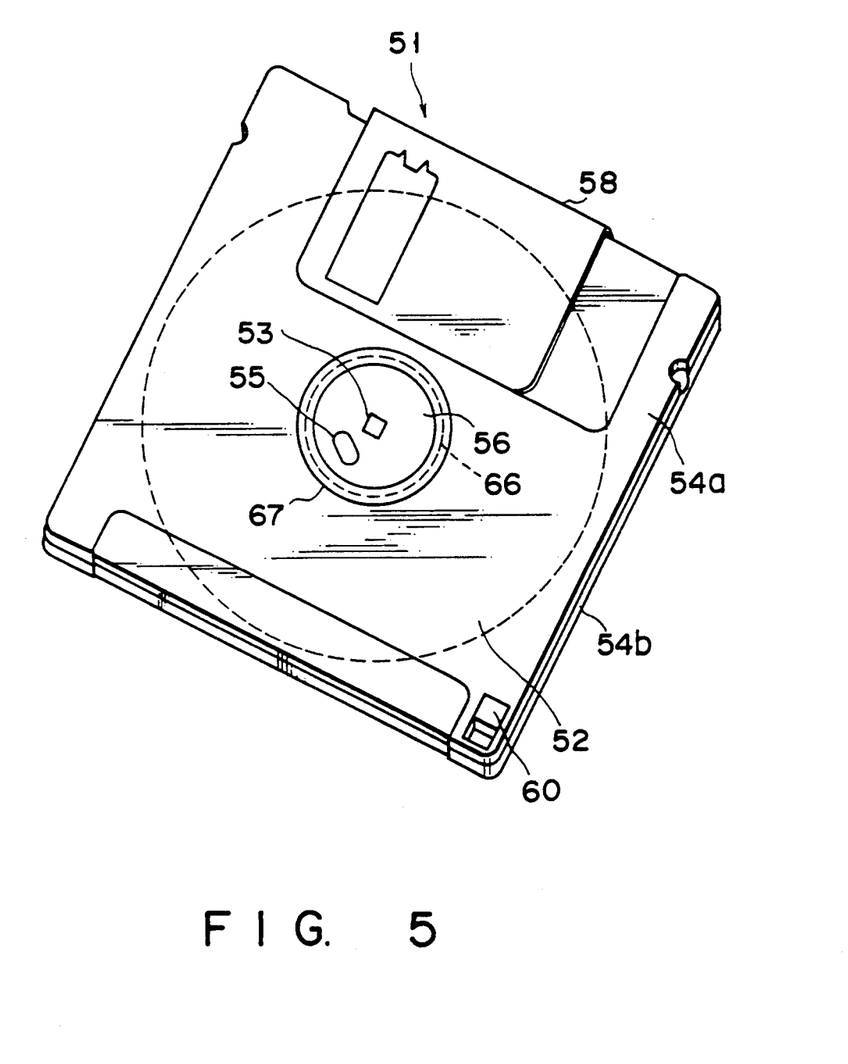
FIG. 5 is a schematic perspective view of a magnetic disc cartridge according to the second embodiment of the present invention.

In FIG. 5 is shown a 3.5 inch magnetic disc cartridge 51 which comprises a magnetic disc 52 coated with magnetic material as a recording medium, and a front half case 54a and a rear half case 54b cooperating with each other to hold the magnetic disc 52. On the central portion of the magnetic disc 52 is provided a hub 56 having a central hole 53 and another hole 55 displaced from the center of the hub 56. A movable U-shaped metal shutter 58 covers a portion of each of the half cases 54a and 54b. A spring, not shown, connected to the case and the shutter forces the shutter horizontally along the surface of the case. In a corner of each of the half cases 54a and 54b is formed a write protector 60 for prohibiting information recording. A circular hole 66 is formed in the half case 54a so that the hub 56 provided in the central portion of the magnetic disc 52 is exposed. On the edge portion of the circular hole 66 is disposed a circular rim 67 for preventing dust from entering the magnetic disc cartridge 51 through the circular hole 66.

Figure 6:
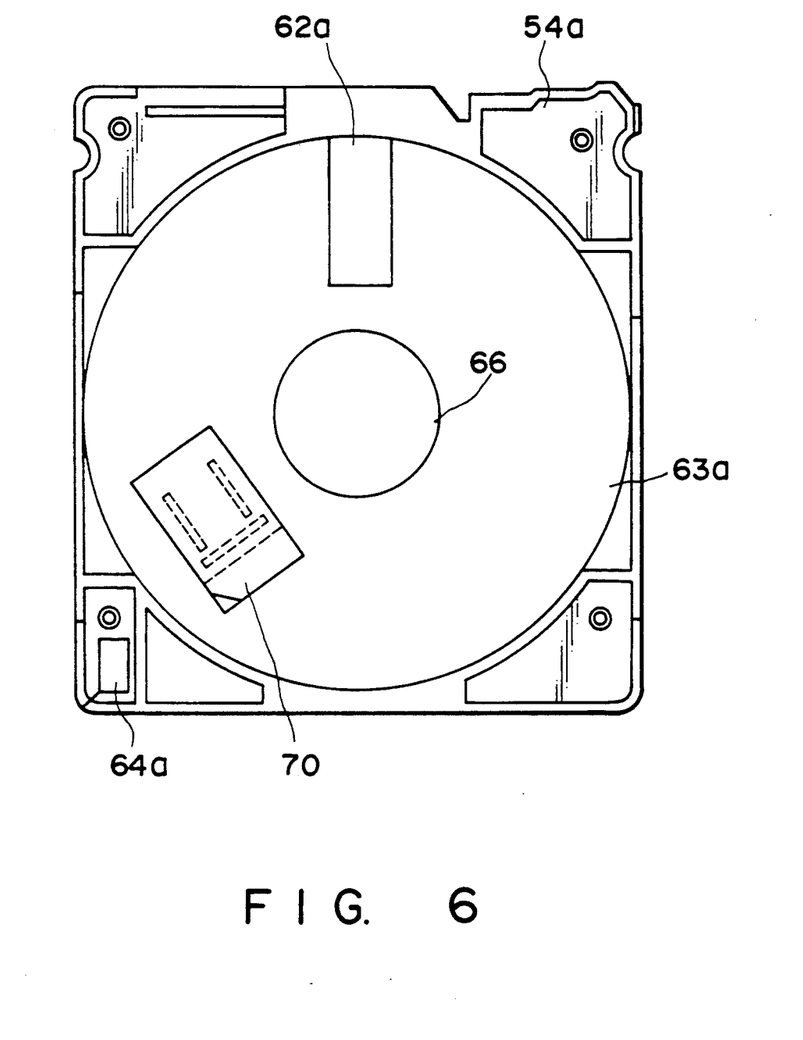
FIG. 6 is a plan view showing the interior of one of the two half cases of the magnetic disc cartridge of FIG. 5.

The half case 54a of the magnetic disc cartridge 51 is shown in FIG. 6. In the half case 54a is formed a window 62a in which is inserted a magnetic head, not shown, for recording information on the magnetic disc 52 and reproducing information therefrom. A substantially circular surface 63a is formed on the inner wall of the half case 54a so as to house the magnetic disc 52. A hole 64a for the write protector 60 is also formed in the half case 54a. A liner 68a (FIG. 8) is attached to a portion of the surface 63a of the half case 54a. A metal lifter 70 presses the liner 68a upwardly separated from FIG. 6.

Figure 7:
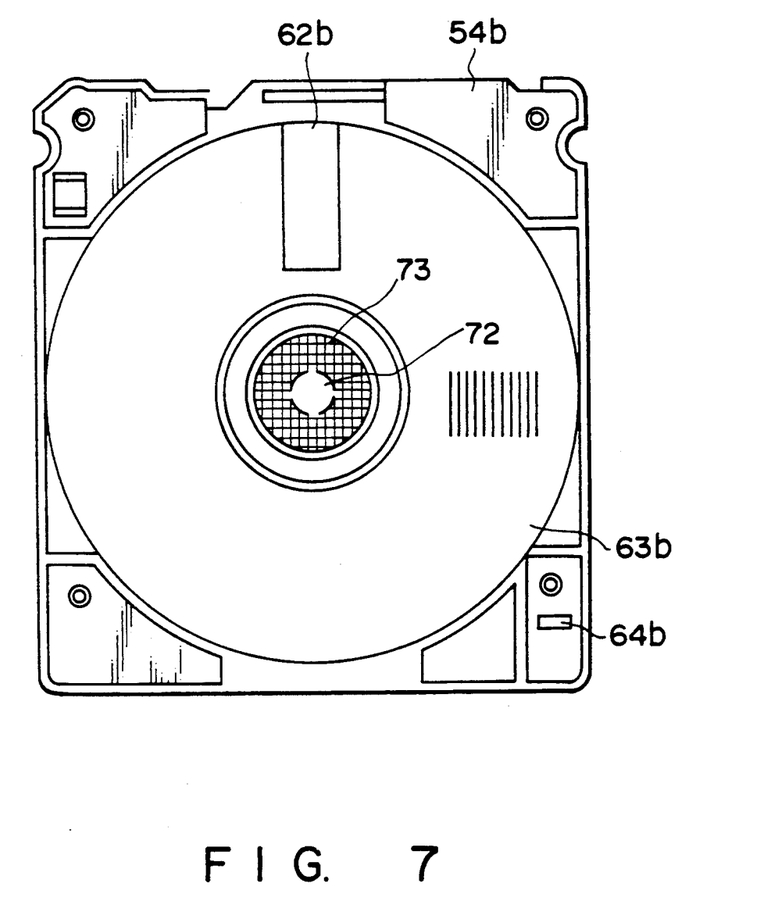
FIG. 7 is a plan view showing the interior of the other half case of the magnetic disc cartridge of FIG. 5.

In FIG. 7 is shown the half case 54b having a window 62b in which is inserted the magnetic head, not shown, for recording information on the magnetic disc 52 and reproducing information therefrom. A substantially circular surface 63b is formed on the inner wall of the case 54b so as to hold the magnetic disc 52. A hole 64b for the write protector 60 is also formed in the half case 54b. A center sheet 72 made of hard resin material is provided on the central portion of the half case 54b so as to face the magnetic disc 52. A ring-shaped permanent magnet 73 as magnetic means for attracting the hub 56 of the magnetic disc 52 surrounds the center sheet 72.

Figure 8:
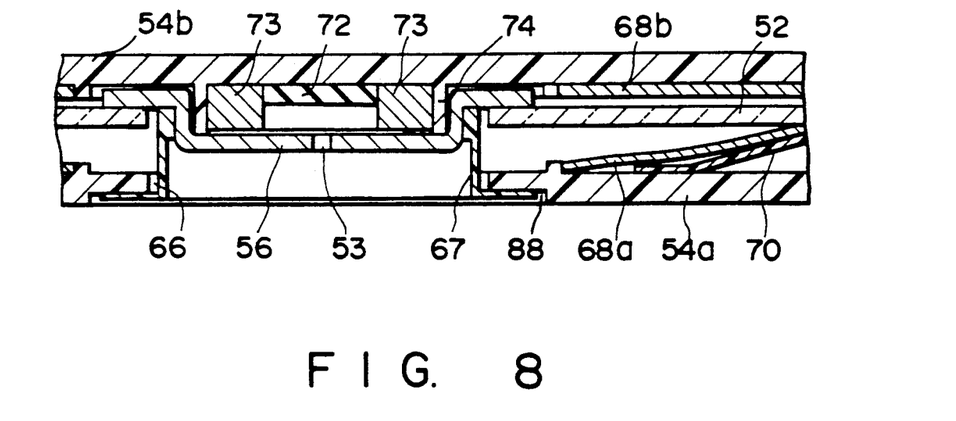
FIG. 8 is a partial cross-sectional view of the magnetic disc cartridge according to the second embodiment of the present invention.

FIG. 8 is a partial cross-sectional view of the magnetic disc cartridge 51. Between the half cases 54a and 54b and the corresponding surfaces of the magnetic disc 52 are placed liners 68a and 68b. Between the half case 54a and the liner 68a is disposed the lifter 70 for pressing the liner 68a in a direction toward the magnetic disc 52. On the inner wall of the half case 54b is integrally formed a rib, not shown, for pressing the liner 68b toward the magnetic disc 52. On the inner surface of the half case 54b facing the magnetic disc 52 is mounted a center sheet 72 around which is provided a ring-shaped permanent magnet 73 for attracting the hub 56.

Figure 9:
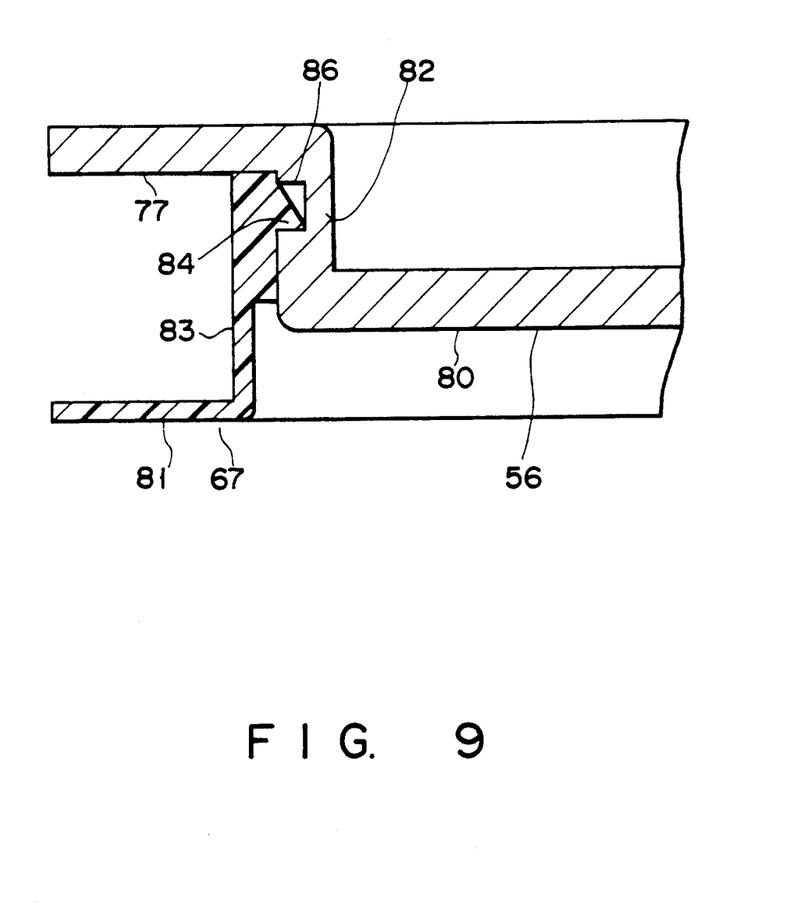
FIG. 9 is an enlarged cross-sectional view of the hub and the vicinity of the hub of the magnetic disc cartridge of the second embodiment.
Figure 10:
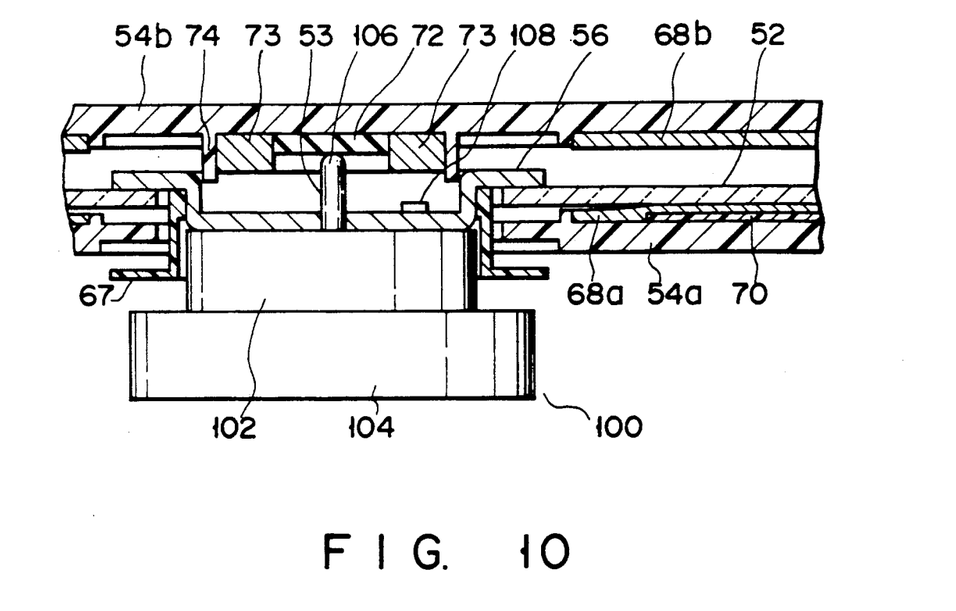
FIG. 10 is a partial cross-sectional view of the magnetic disc cartridge of FIG. 8 and disc driving means mounted thereon.

FIG. 9 is a cross-sectional view of the combination of the hub 56 and a rim 67. The hub 56 has a flange portion 77 and a chucked surface 80 which is chucked by a driving device 100 (FIG. 10). The upper surface of the flange portion 77 and the chucked surface 80 are finished at a high surface accuracy so that the magnetic disc 52 does not become corrugated. The hub 56 has a bent portion 82 formed between the flange portion 77 and the chucked surface 80. The rim 67 cooperating with the hub 56 interrupts the communication between the hole 66 and the interior of the magnetic disc cartridge. The rim 67 has a ring portion 81 and a cylindrical engaging portion 83 engageable with the hub 56. The engaging portion 83 is provided with a pawl 84 which is received in a groove 86 formed in the bent portion 82 to fix the rim 67 to the hub 56.

The magnetic disc cartridge 51 as is shown in FIG. 8 is in a state in which it is not mounted on the driving device. In this state, the hub 56 attracted by the magnet 73 is in contact with a projecting portion 74 which extends longer than the height of the magnet 73, without directly contacting the magnet 73. The liner 68a raised by the lifter 70 provided in the half case 54a lightly touches the magnetic disc 52. The magnetic disc 52 having the hub 56 is forced against the magnet 73. Thus, the magnetic disc 52 rarely vibrates in the magnetic disc cartridge 51 and the hub 56 does not collide with the half cases 54a and 54b in the magnetic disc cartridge 51, even if the magnetic disc cartridge 51 is swung. As a result, foreign matter such as dust is not generated. Further, since the hub 56 is attracted by the magnet 73, the ring portion 81 of the rim 67 connected to the hub 56 contacts a recessed portion 88 to block communication of the interior of the magnetic disc cartridge with the hole 53 by means of the rim 67, with the result that foreign matter such as dust is prevented from entering into the magnetic disc cartridge 51.

In FIG. 10, the magnetic disc cartridge 51 is mounted on the driving device. The hub 56 of the magnetic disc cartridge 51 is attracted by the chucking magnet provided on a chucking portion of the driving device 100. As the chucking magnet of the chucking portion 102 has a much higher magnetic field intensity than the magnet 73, the hub 56 is separated from the projecting portion 74 to be fixed to the chucking portion 102 and to cause a driving pin 108 to be inserted in the hole 55 in the hub 56 (FIG. 5). The magnetic disc 52 is rotated so as to carry out the recording and reproducing of information. After the magnetic disc cartridge 51 is removed from the driving device 100, the hub 56 is separated from the chucking magnet of the chucking portion 102 and is attracted by the magnet 73, whereby the magnetic disc 52 is again fixed in the magnetic disc cartridge 51.

Although the liner 68a is pressed against the magnetic disc 52 by means of the lifter 70, the magnetic disc 52 and the liner 68a are not strongly rubbed with each other. Accordingly, dust is rarely produced due to the rubbing between the magnetic disc 52 and the liner 68a when the magnetic disc cartridge is swung. In case that the magnetic disc cartridge 51 is not operated, the rim 67 interrupts the communication between the hole 66 and the interior of the magnetic disc cartridge 51 so as not to allow foreign matter such as dust to be intruded from the atmosphere into the magnetic disc cartridge 51. Let it be assumed that the magnetic disc cartridge is held by setting the half case having the circular hole to be a lower case. With the conventional magnetic disc cartridge, since the liner is strongly pressed against the magnetic disc by means of the lifter, the pressing force of the liner is gradually decreased due to age deterioration of the lifter. On the contrary, with the present invention, since the magnetic disc is disposed in a position opposite to the lifter in the magnetic disc cartridge and is attracted by the magnet, the deterioration of the strength of the lifter scarcely occurs. Further, the magnetic disc receives a weak force from the lifter and thus it is not deformed by the force. Due to these specific features, the magnetic disc keeps a low modulation of output even when it is stored for a long time.

In the second embodiment, the combination of a center sheet 72 and a ring-shaped magnet 73 coaxially surrounding the center sheet 72 may be replaced by a center sheet containing magnetic material and covering all of the central portion which the center sheet and the magnet of the second embodiment occupy.

The rim 67 of the second embodiment is mounted on the hub by only close fitting without lowering productivity as compared with the case of the conventional magnetic disc cartridge.

The second embodiment employs a 3.5 inch magnetic disc cartridge but may use magnetic disc of other various sizes, and is also applicable to an optical disc cartridge and the like.

In the second embodiment, the permanent magnet is disposed not only in a half case having a center sheet but also in the other half case so that the magnet is placed on a disc holding surface around a circular hole of the other half case. In this case, a hub is coated with magnetized material. The magnetized material i arranged such that its magnetic polarity is the same as that of the permanent magnet in the other half case. The hub is repulsed by the magnetic force of the permanent magnet in the other half case to be fixed in the half case having the center sheet. Therefore, foreign matter such as dust is hardly generated in the half cases even if an external force is applied to the magnetic disc cartridge. Further, as a magnetic disc, liners and a lifter weakly contact each other, the deformation and the deterioration of the strength of the lifter are greatly reduced. Further, the rim in the magnetic disc cartridge blocks communication between the atmosphere and the interior of the magnetic disc cartridge, whereby external foreign matter such as dust is rarely intruded in the magnetic disc cartridge.

According to this invention, the vibration of the magnetic disc is prevented by the hub and the magnetic means acting on the hub, thereby reducing the generation of foreign matter such as dust in the magnetic disc cartridge. In addition, the rim mounted on the hub hinders foreign matter from entering the magnetic disc cartridge. Owing to these features, the present invention provides a magnetic disc cartridge for carrying out the recording and the reproducing of information at a high reliability.

When dust exits in a magnetic disc cartridge, a disc is likely to be damaged while a magnetic head is running and it is likely that no data can be read. The present invention is particularly effective when it is adapted to a magnetic disc cartridge.

A disc cartridge according to the present invention has a feature in which little dust is generated therein. Hence, drop-out and erroneous reading hardy occur.

The above-mentioned embodiments are explained by using magnetic discs but these discs may be replaced by optical disc or optomagnetic devices.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disc cartridge comprising:
   disc-shaped information recording means;
   driving force transmitting means, provided in a center of said information recording means, for rotating said information recording means when said driving force transmitting means is influenced by a driving force;
   means for housing said information recording means, said housing means comprising first and second portions, said first and second portions having inner surfaces adjacent to said information recording means, said first portion having an opening to expose said driving force transmitting means;
   means, provided on said inner surface of each of said first and second portions of said housing means, for removing dust from said information recording means;
   pressing means, provided only between said inner surface of said first portion of said housing means and said dust removing means on said first portion of said housing means, for applying a force in a direction from said first portion of said housing means toward said information recording means; and
   magnetic means for moving said information recording means in a direction towards said second portion.

2. A disc cartridge according to claim 1, wherein said information recording means comprises a magnetic disc for magnetically recording and reproducing information.

3. A disc cartridge comprising:
   disc-shaped information recording means;
   driving force transmitting means, provided in a center of said information recording means, for rotating said information recording means when said driving force transmitting means is influenced by a driving force;
   means for housing said information recording means, said housing means comprising first and second portions, said first and second portions having inner surfaces adjacent to said information recording means, said first portion having an opening to expose said driving force transmitting means;
   means, provided on said inner surface of each of said first and second portions of said housing means, for removing dust from said information recording means;
   pressing means, provided only between said inner surface of said first portion of said housing means and said dust removing means on said first portion of said housing means, for applying a force in a direction from said first portion of said housing means toward said information recording means; and magnetic means for moving said information recording means in a direction towards said second portion, said magnetic means being mounted on said inner surface of said second portion of said housing means and comprising means for attracting said driving force transmitting means.

4. A disc cartridge according to claim 3, wherein said magnetic means comprises a center sheet and a ring-shaped member surrounding said center sheet.

5. A disc cartridge according to claim 3, wherein said magnetic means comprises a center sheet.

6. A disc cartridge according to claim 3, wherein said magnetic means and said driving force transmitting means do not contact each other when said magnetic means moves said information recording means in said direction towards said second portion.

7. A disc cartridge according to claim 3, wherein said magnetic means provides an attracting force larger than a total weight of said information recording means and said driving force transmitting means.

8. A disc cartridge according to claim 1, wherein said magnetic means is mounted on said inner surface of said first portion of said housing means and comprises means for repelling said driving force transmitting means.

9. A disc cartridge according to claim 8, wherein said magnetic means comprises a ring-shaped member disposed at an edge of said opening which exposes said driving force transmitting means.

10. A disc cartridge comprising:
disc-shaped information recording means;
driving force transmitting means, provided in a center of said information recording means, for rotating said information recording means when said driving force transmitting means is influenced by a driving force;
means for housing said information recording means, said housing means comprising first and second portions, said first and second portions having inner surfaces adjacent to said information recording means, said first portion having an opening, to expose said driving force transmitting means;
means, provided on said inner surface of each of said first and second portions of said housing means, for removing dust from said information recording means;
pressing means, provided only between said inner surface of said first portion of said housing means and said dust removing means on said first portion of said housing means, for applying a force in a direction from said first portion of said housing means toward said information recording means;
magnetic means for moving said information recording means in a direction towards said second portion; and
means for closing said opening when said magnetic means moves said information recording means towards said second portion, said closing means extending from said drive force transmitting means circumferentially along an edge portion of said opening.

11. A disc cartridge according to claim 10, wherein said information recording means comprises a magnetic disc for magnetically recording and reproducing information.

12. A disc cartridge comprising:
disc-shaped information recording means;
driving force transmitting means, provided in a center of said information recording means, for rotating said information recording means when said driving force transmitting means is influenced by a driving force;
means for housing said information recording means, said housing means comprising first and second portions, said first and second portions having inner surfaces adjacent to said information recording means, said first portion having an opening to expose said driving force transmitting means;
means, provided on said inner surface of each of said first and second portions of said housing means, for removing dust from said information recording means;
pressing means, provided only between said inner surface of said first portion of said housing means and said dust removing means on said first portion of said housing means, for applying a force in a direction from said first portion of said housing means toward said information recording means;
magnetic means for moving said information recording means in a direction towards said second portion; and
means for closing said opening when said magnetic means moves said information recording means towards said second portion, said closing means extending from said drive force transmitting means circumferentially along an edge portion of said openings and closing means comprising resin material,
wherein said magnetic means provides an attracting force larger than a total weight of said information recording means, said driving force transmitting means and said closing means.

13. A disc cartridge comprising:
disc-shaped information recording means;
driving force transmitting means, provided in a center of said information recording means, for rotating said information recording means when said driving force transmitting means is influenced by a driving force;
means for housing said information recording means, said housing means comprising first and second portions, said first and second portions having inner surfaces adjacent to said information recording means, said first portion having an opening to expose said driving force transmitting means;
means, provided on said inner surface of each of said first and second portions of said housing means, for removing dust from said information recording means;
pressing means, provided only between said inner surface of said first portion of said housing means and said dust removing means on said first portion of said housing means, for applying a force in a direction from said first portion of said housing means toward said information recording means;
magnetic means for moving said information recording means in a direction towards said second portion, said magnetic means being mounted on said inner surface of said second portion of said housing means and comprising means for attracting said driving force transmitting means; and
means for closing said opening when said magnetic means moves said information recording means towards said second portion, said closing means extending from said drive force transmitting means circumferentially along an edge portion of said opening.

14. A disc cartridge comprising:

disc-shaped information recording means;

driving force transmitting means, provided in a center of said information recording means, for rotating said information recording means when said driving force transmitting means is influenced by a driving force;

means for housing said information recording means, said housing means comprising first and second portions, said first and second portions having inner surfaces adjacent to said information recording means, said first portion having an opening to expose said driving force transmitting means;

means, provided on said inner surface of each of said first and second portions of said housing means, for removing dust from said information recording means;

pressing means, provided only between said inner surface of said first portion of said housing means and said dust removing means on said first portion of said housing means, for applying a force in a direction from said first portion of said housing means toward said information recording means;

magnetic means for moving said information recording means in a direction towards said second portion, said magnetic means being mounted on said inner surface of said first portion of said housing means and comprising means for repelling said driving force transmitting means; and means for closing said opening when said magnetic means moves said information recording means towards said second portion, said closing means extending from said drive force transmitting means circumferentially along an edge portion of said opening.

* * * * *